(12) United States Patent
Müller et al.

(10) Patent No.: US 8,327,976 B2
(45) Date of Patent: Dec. 11, 2012

(54) INSULATION DESIGN FOR THERMAL AND ACOUSTIC INSULATION OF AN AIRCRAFT

(75) Inventors: Rainer Müller, Rosengarten (DE); Benjamin Grenzing, Hamburg (DE); Christian Thomas, Hamburg (DE)

(73) Assignee: Airbus Operations GmbH (DE)

( * ) Notice: Subject to any disclaimer, the term of this patent is extended or adjusted under 35 U.S.C. 154(b) by 128 days.

(21) Appl. No.: 12/676,678

(22) PCT Filed: Jul. 20, 2009

(86) PCT No.: PCT/EP2009/059278
§ 371 (c)(1),
(2), (4) Date: Apr. 29, 2010

(87) PCT Pub. No.: WO2010/015503
PCT Pub. Date: Feb. 11, 2010

(65) Prior Publication Data
US 2011/0067951 A1    Mar. 24, 2011

Related U.S. Application Data

(60) Provisional application No. 61/188,328, filed on Aug. 8, 2008.

(30) Foreign Application Priority Data

Aug. 8, 2008   (DE) .................. 10 2008 037 143

(51) Int. Cl.
| | |
|---|---|
| *E04B 1/88* | (2006.01) |
| *E04B 1/90* | (2006.01) |
| *B64C 1/40* | (2006.01) |
| *E04B 1/74* | (2006.01) |
| *E04B 1/62* | (2006.01) |
| *B64C 1/00* | (2006.01) |

(52) U.S. Cl. ......... 181/290; 181/210; 181/291; 244/119
(58) Field of Classification Search .................. 181/290, 181/286, 284, 210, 204, 205, 292, 291; 244/119, 244/117 R, 121, 1 N
See application file for complete search history.

(56) References Cited

U.S. PATENT DOCUMENTS
2,785,099 A *  3/1957  Holtsford .................. 52/411
(Continued)

FOREIGN PATENT DOCUMENTS
DE     102006023209 A1    11/2007
(Continued)

OTHER PUBLICATIONS

Zeitler, "Untersuchung der Hubschrauberinnenakustik mittels der Methode der statistischen Energieanalyse", Publikationen des Lehrstuhls für Leichtbau der technischen Universität, Nov. 6, 2006, XP002548320. München, pp. 25 and 62. (translation of abstract on p. 3).

*Primary Examiner* — Edgardo San Martin
(74) *Attorney, Agent, or Firm* — Lerner, David, Littenberg, Krumholz & Mentlik, LLP

(57) ABSTRACT

The invention pertains to an insulation structure for thermally and acoustically insulating an aircraft that features at least one heavy layer, wherein the insulation structure according to the invention is characterized in that the insulation structure comprises an additional absorption layer, in that the heavy layer is perforated at least in certain areas, and in that the perforated area ratio of the heavy layer is adapted in such a way that the heavy layer is essentially transparent to sound for frequencies below a double-wall frequency of the insulation structure. This makes it possible to dampen sound with low frequencies below the double-wall frequency as effectively as possible.

13 Claims, 8 Drawing Sheets

U.S. PATENT DOCUMENTS

| | | | | |
|---|---|---|---|---|
| 2,819,032 | A * | 1/1958 | Detrie et al. | 244/119 |
| 3,056,707 | A * | 10/1962 | Waggoner et al. | 181/286 |
| 3,126,978 | A * | 3/1964 | Bergstrom | 181/290 |
| 3,324,967 | A * | 6/1967 | Robinson | 181/290 |
| 4,130,175 | A * | 12/1978 | Hehmann | 181/290 |
| 4,137,992 | A | 2/1979 | Herman | |
| 4,194,329 | A * | 3/1980 | Wendt | 52/145 |
| 4,313,524 | A * | 2/1982 | Rose | 181/291 |
| 4,428,454 | A * | 1/1984 | Capaul et al. | 181/290 |
| 4,594,278 | A * | 6/1986 | Nixon | 428/68 |
| 4,823,909 | A * | 4/1989 | Nakamura et al. | 181/290 |
| 4,838,524 | A * | 6/1989 | McKeown et al. | 256/24 |
| 4,940,112 | A * | 7/1990 | O'Neill | 181/290 |
| 4,966,799 | A * | 10/1990 | Lucca et al. | 428/95 |
| 5,192,624 | A * | 3/1993 | Morimoto | 428/596 |
| 5,550,338 | A * | 8/1996 | Hielscher | 181/290 |
| 5,665,447 | A * | 9/1997 | Greaves et al. | 428/68 |
| 5,681,072 | A * | 10/1997 | Stricker | 296/39.3 |
| 5,831,225 | A * | 11/1998 | Campbell | 181/284 |
| 5,854,452 | A * | 12/1998 | Campbell et al. | 181/290 |
| 5,856,640 | A * | 1/1999 | Lynn | 181/218 |
| 6,123,170 | A * | 9/2000 | Porte et al. | 181/214 |
| 6,345,688 | B1 * | 2/2002 | Veen et al. | 181/290 |
| 6,439,340 | B1 | 8/2002 | Shirvan | |
| 6,698,543 | B2 * | 3/2004 | Golterman | 181/291 |
| 7,249,654 | B2 * | 7/2007 | Nakamoto et al. | 181/290 |
| 7,434,660 | B2 * | 10/2008 | Yamagiwa et al. | 181/293 |
| 7,445,084 | B2 * | 11/2008 | Berbner et al. | 181/290 |
| 7,467,687 | B2 * | 12/2008 | Mitchell et al. | 181/200 |
| 7,578,468 | B2 * | 8/2009 | Drost | 244/117 R |
| 7,604,095 | B2 * | 10/2009 | Mitchell | 181/290 |
| 7,837,007 | B2 * | 11/2010 | Hotzeldt et al. | 181/210 |
| 7,909,134 | B2 * | 3/2011 | Krus et al. | 181/210 |
| 7,946,384 | B2 * | 5/2011 | Foster et al. | 181/290 |
| 7,963,363 | B2 * | 6/2011 | Niwa et al. | 181/290 |
| 8,061,475 | B2 * | 11/2011 | Mori et al. | 181/205 |
| 2002/0117352 | A1 * | 8/2002 | Veen et al. | 181/292 |
| 2004/0175516 | A1 | 9/2004 | Schmitz et al. | |
| 2006/0060421 | A1 * | 3/2006 | Sarin et al. | 181/290 |
| 2007/0137926 | A1 * | 6/2007 | Albin et al. | 181/290 |
| 2008/0128200 | A1 | 6/2008 | Tsugihashi et al. | |
| 2008/0308676 | A1 * | 12/2008 | Muller | 244/119 |
| 2009/0026787 | A1 * | 1/2009 | Muller et al. | 296/39.1 |
| 2009/0090812 | A1 | 4/2009 | Boock et al. | |
| 2009/0173571 | A1 * | 7/2009 | Keller | 181/292 |
| 2009/0250293 | A1 * | 10/2009 | Gleine et al. | 181/292 |
| 2009/0302154 | A1 | 12/2009 | Groning | |
| 2010/0025147 | A1 * | 2/2010 | Kassa | 181/290 |
| 2010/0108438 | A1 * | 5/2010 | Duffy | 181/290 |
| 2010/0148001 | A1 * | 6/2010 | Hoetzeldt et al. | 244/1 N |
| 2010/0213002 | A1 * | 8/2010 | Oboodi et al. | 181/290 |
| 2011/0139542 | A1 * | 6/2011 | Borroni | 181/290 |
| 2011/0266088 | A1 * | 11/2011 | Koike et al. | 181/290 |
| 2011/0284689 | A1 * | 11/2011 | Thomas et al. | 244/1 N |

FOREIGN PATENT DOCUMENTS

| | | |
|---|---|---|
| EP | 0378979 A1 | 7/1990 |
| EP | 1535834 A2 | 6/2005 |
| EP | 1612768 A1 | 1/2006 |
| JP | 05504528 T | 7/1993 |
| JP | 05203095 A | 8/1993 |
| JP | 06305489 A | 11/1994 |
| JP | 2005001403 A | 1/2005 |
| JP | 2005231467 A | 9/2005 |
| JP | 2006119228 A | 5/2006 |
| RU | 2159185 C1 | 11/2000 |
| RU | 2195403 C2 | 12/2002 |
| WO | 9201587 A1 | 2/1992 |
| WO | 2005095206 A1 | 10/2005 |
| WO | 2006114332 A2 | 11/2006 |

* cited by examiner

INSULATION DESIGN FOR THERMAL AND ACOUSTIC INSULATION OF AN AIRCRAFT

CROSS-REFERENCE TO RELATED APPLICATIONS

This application is a national phase entry under 35 U.S.C. §371 of International Application No. PCT/EP2009/059278, filed Jul. 20, 2009, published in German, which claims the benefit of the filing date of U.S. provisional patent application No. 61/188,328, filed Aug. 8, 2008, and German patent application No. 10 2008 037 143.2, filed Aug. 8, 2008, the disclosures of which applications are hereby incorporated herein by reference.

TECHNICAL FIELD

The invention relates to an insulation structure for thermally and acoustically insulating an aircraft.

BACKGROUND OF THE INVENTION

Modern aircraft are thermally and acoustically insulated in order to ensure a thermal comfort and to limit the noise level in the cabin. Substantially the noises to be reduced in this context are usually created outside the aircraft, for example by the turbulent flow boundary layer on the fuselage and by the exhaust jet of the engines. In addition to increasing comfort demands by passengers, higher cruising speeds, as well as the acoustically disadvantageous characteristics of aircraft fuselages of fiber composite materials in direct comparison with monolithic metallic materials, represent an increasing challenge with respect to the acoustic insulation. Particularly the acoustic efficiency requirements of the insulation with respect to sound damping and sound absorption continuously increase for this reason and cannot be met with conventional insulation structures.

The thermal insulation of an aircraft fuselage—the so-called primary insulation—is usually composed of mat-shaped insulation assemblies that consist of glass wool of relatively low density (for example less than 10 kg/m$^3$) in a thin foil wrapping. Mats for a skinplate region between the frames above the stringers used as longitudinal reinforcement of a fuselage, as well as mats for wrapping the frames, are used in this case.

This conventional thermal insulation also fulfills the function of the acoustic insulation and therefore contributes to ensuring the cabin comfort with respect to temperature and noise. The acoustic efficiency of conventionally used glass wool assemblies is relatively high in the high-frequency range that essentially includes the speech intelligibility range, whereas only an insignificant sound damping takes place at frequencies below 500 Hz. If stricter demands with respect to the noise comfort in the interior need to be met as it is the case, for example, in corporate or private aircraft, it is common practice to use, among other things, needled felt materials that are fixed, for example, above the frame heads, to some extent also such that they face away from the fuselage.

According to publication WO 2005/095206, as well as publication WO 2006/114332, multilayer insulation assemblies that are composed of different materials can be used for increasing the acoustic comfort within the cabin of an aircraft. A person skilled in the art is furthermore familiar with the fact that the degree of sound damping of a structure can be increased, particularly in the low-frequency range (for example lower than 500 Hz), by increasing the mass of the outer skin of the aircraft or by using an additional layer with relatively high specific density in the insulation structure. In this case, the increase in the weight per unit area of the aircraft fuselage can be realized, for example, in the form of a direct application of so-called damping coverings or heavy layers onto the skinplates.

In addition, the advantageous acoustic properties of double-wall structures in comparison with single walls are also known. At an altogether identical weight of the measure for reducing the sound transmission, higher degrees of sound damping are achieved with a distribution over two wall elements than with the concentration of the same weight on a single wall. The weight available for acoustic measures is limited, particularly in aircraft construction, such that a person skilled in the art would prefer the construction of double-wall or multi-wall structures in order to provide the best noise reduction possible.

In aforementioned WO 2006/114332, an insulation structure for use in corporate aircraft is disclosed, in which a double-wall structure consisting of outer skin and a heavy foil is produced by utilizing a combined assembly of a porous absorber and a heavy foil in connection with the outer skin of an aircraft. However, this structure has different disadvantages. At the so-called double-wall resonant frequency that essentially results from the mass of the heavy foil and the distance between the heavy foil and the outer skin of the aircraft, the double wall produced by the structure causes a drop in the degree of sound damping and only exhibits the known advantageous acoustic properties above this double-wall resonant frequency. In addition, the fuselage, the heavy foil and the interior lining panels result in a multi-wall structure with other resonant effects and associated drops in the degree of sound damping, in particular, in the sidewall region of aircraft. These double-wall and multi-wall resonances are created due to the fact that the air enclosed between the walls in the regions of reinforcing components acts as a spring such that an oscillatory spring-mass system is created.

The heavy foil used also acoustically covers the primary insulation arranged on the aircraft fuselage. However, this means that the sound energy between the heavy foil and the cabin lining can no longer be absorbed such that the effective absorber layer thickness on the cabin side is reduced.

In addition, a closed heavy foil within a thermal insulation structure acts as a vapor barrier such that the utilization of the heavy foil results in the formation of condensation water that is absorbed by the adjacent porous insulation material. Since the insulation material is completely covered, it is difficult or entirely impossible to dry this material such that the weight of the materials in the thermal and acoustical insulation continuously increases over the service life of the aircraft.

SUMMARY OF THE INVENTION

It is the object of the invention to provide an insulation structure for thermally and acoustically insulating an aircraft that has a low weight and is particularly well suited for damping low-frequency noises, but does not affect the thermal insulation and cause condensation.

This object is met by an insulation structure for thermally and acoustically insulating an aircraft that features at least one heavy layer and an absorption layer that is preferably arranged on the cabin side of the heavy layer, wherein the heavy layer is perforated at least in certain areas and the ratio of its perforated area is adapted in such a way that the heavy layer is essentially transparent to sound for frequencies below a double-wall frequency of the insulation structure.

Due to the perforation of the heavy layer, the above-described drop in the degree of sound damping of an acoustically impervious heavy layer is prevented. However, the insulation structure according to the invention has the advantageous acoustic properties of a double wall above the double-wall resonant frequency in the sense of the added weight of the heavy layer. Consequently, an enclosed air cushion can no longer be created due to the perforation and the formation of an oscillatory mass-spring system is suppressed. Depending on the degree of perforation or the perforated area ratio to be adjusted, however, the heavy layer can still be considered as acoustically impervious for higher frequencies that lie above the double-wall frequency of the insulation structure according to the invention. Due to the perforation in the heavy layer, the water vapor transport can also be preserved such that the insulation of the aircraft can dry out while the aircraft is on the ground. The perforation according to the invention therefore prevents the heavy layer from acting as a vapor barrier.

In one particularly advantageous insulation structure according to the invention, the absorption layer consists of a porous material. This material could consist, for example, of glass wool. A particularly effective sound absorption is achieved in this fashion.

In one particularly advantageous insulation structure according to the invention, the absorption layer has a density between 3.5 kg/m$^3$ and 25 kg/m$^3$. In the construction of aircraft, particular attention is generally paid to the lowest component weight possible, wherein the indicated density range represents a compromise between the best sound absorption possible and the lowest weight possible.

A thickness of the absorption layer in the range between 5 mm and 55 mm is also particularly advantageous because this comparatively thin layer thickness in combination with the perforated heavy layer suffices for effectively absorbing low frequencies while simultaneously maintaining the increased weight and overall thickness caused by the insulation structure according to the invention within acceptable limits.

A weight per unit area of the heavy layer between 0.5 kg/m$^2$ and 4 kg/m$^2$ is preferred in the insulation structure according to the invention because the degree of sound damping can be increased and the effectiveness of the structure according to the invention can be improved due to the utilization of an additional mass. In the cited range of the weight per unit area, sufficient sound damping of low frequencies can be achieved, for example, with the double-wall frequency that is advantageously adjusted for this purpose.

Furthermore, an advantageous additional development of the insulation structure according to the invention is designed for accommodating a first component of a mounting arrangement that corresponds to a second component of the mounting arrangement rigidly fixed on the aircraft structure in order to produce a connection. This is sensible because several first components of the mounting arrangement can already be integrated during the manufacture of the insulation structure and several second components can already be positioned at predetermined locations during the assembly of the aircraft. This makes it possible to eliminate one or more steps for mounting the insulation structure according to the invention during the final assembly of the aircraft. Due to the corresponding positions of the first and the second components of the mounting arrangement, the first components arranged on the insulation structure according to the invention merely need to be joined with the second components. This is preferably realized with snap-on or locking connections.

In an advantageous additional development of the insulation structure according to the invention, it is proposed that the second component of the mounting arrangement or a plurality thereof is arranged on the outer skin of the aircraft on the inner side of the fuselage. This allows a simple mounting of the insulation structure according to the invention directly on the outer skin of the aircraft such that the insulation structure does not cause an excessive restriction of the structural space for the cabin.

The arrangement of second components of the mounting arrangement on the inner side of the fuselage on one or more structural reinforcing components is advantageous because the double-wall frequency is additionally lowered due to the greater distance between the fuselage and the heavy layer such that the effectiveness of the insulation structure according to the invention is improved. The term reinforcing component refers to all components that are used for reinforcing the aircraft fuselage such as, for example, frames as lateral reinforcements and stringers as longitudinal reinforcements.

In an advantageous additional development of the insulation structure according to the invention, the second components of the mounting arrangement are rigidly bonded onto or laminated into the aircraft structure. In aircraft fuselages that are manufactured of metallic materials, it is advantageous to bond the second components of the mounting arrangement. This makes it possible to eliminate the drilling of holes for rivet or screw joints, as well as their cleaning, sealing and the like. On the other hand, it is particularly advantageous to laminate the second components of the mounting arrangement into the fuselage during the manufacture thereof if the aircraft fuselage is manufactured of a fiber composite material such as, e.g., CFRP. Although a certain flexibility in the subsequent arrangement of second components is lost in this case, a high degree of a prefabrication of the aircraft fuselage can be achieved. The laminating of the second components furthermore results in a particularly rigid connection.

It is furthermore preferred that the first component and the second components are designed for producing a positive or non-positive connection. Connections of this type can be produced in such a way that they suffice for the entire service life of the components to be mounted. Both connecting techniques can be realized in a relatively simple fashion and integrated into the first and second components, wherein the activation of the connection can frequently also be realized without tools and therefore quite easily. Positive connections to be considered are, for example, snap-on or locking connections. Non-positive connections comprise, for example, clamping connections that, however, could require the use of tools in order to be separated.

It is furthermore advantageous that the first and/or the second component is also designed for mounting objects, devices, lines or the like. Due to this measure, the mounting arrangement for the insulation structure according to the invention not only fulfills the function of mounting the insulation structure according to the invention, but other objects may also be mounted on the first component. The first component of the mounting arrangement preferably points into the inner region of the fuselage such that, for example, electric lines, oxygen or water lines, cable ducts and the like can be mounted directly adjacent to the insulation structure according to the invention in a relatively simple fashion.

The object of the invention is furthermore met by a method for manufacturing an insulation structure that features at least one heavy layer and one absorption layer, wherein the following steps are carried out in the method according to the invention: in an absorption layer and a heavy layer, the heavy layer is perforated, wherein the perforated area ratio of the heavy layer is adapted in such a way that the heavy layer is essentially transparent to sound for frequencies below a double-wall frequency of the insulation structure; at least one first component of the mounting arrangement is integrated into at least one of the elements absorption layer and heavy layer, and the first components of the mounting arrangement are joined with second components of the mounting arrangement that are rigidly arranged on structures. The object of the invention is ultimately also met by a use of the insulation structure according to the invention and with an aircraft featuring at least one insulation structure according to the invention.

BRIEF DESCRIPTION OF THE DRAWINGS

Other characteristics, advantages and possible applications of the present invention result from the following description of exemplary embodiments and the figures, wherein all described and/or graphically illustrated characteristics define the object of the invention individually and in arbitrary combinations regardless of their composition in the individual claims or their reference. Furthermore, identical or similar objects are identified by the same reference symbols in the figures. In the drawings:

DETAILED DESCRIPTION OF EXEMPLARY EMBODIMENTS

Figure 1:
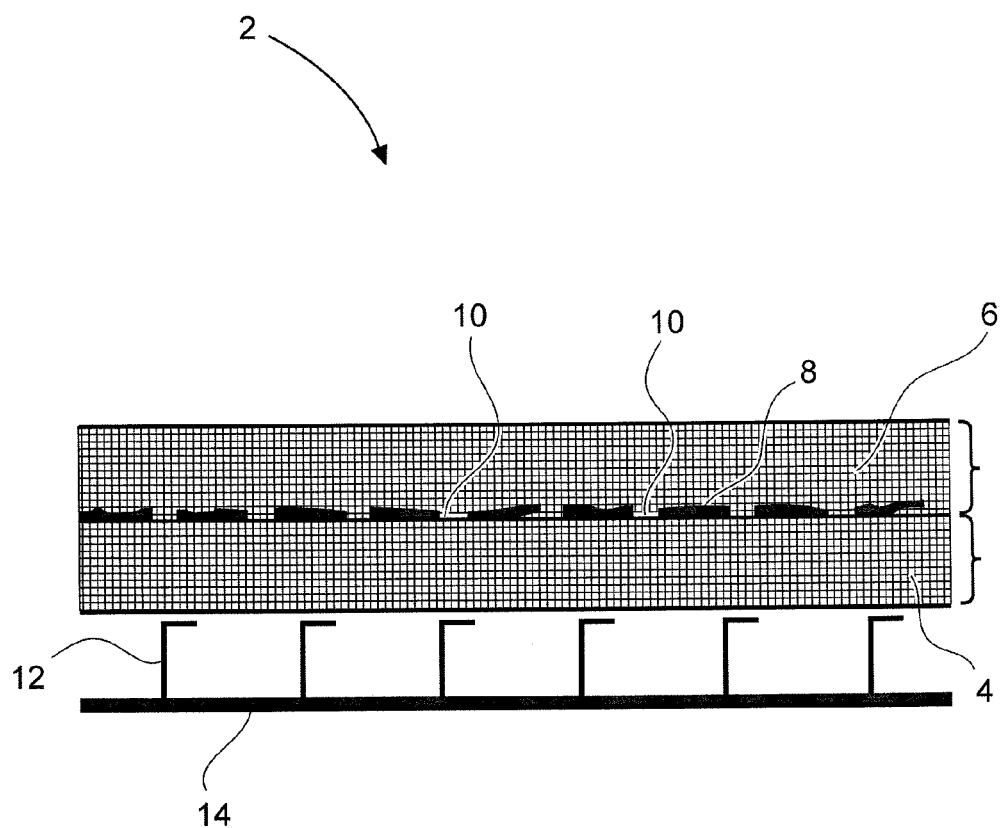
FIG. 1 shows a schematic representation of an insulation structure according to the invention.

FIG. 1 shows an insulation structure 2 according to the invention that features an insulation layer 4, an absorption layer 6 and a heavy layer 8 arranged in between. The heavy layer 8 is perforated and therefore features a series of holes 10, the ratio of which referred to the entire surface of the heavy layer, i.e., the perforated area ratio, is realized such that the heavy layer 8 is essentially transparent to sound for frequencies below a double-wall frequency of the insulation structure 2 according to the invention. In this context, transparent to sound means that the heavy layer is transparent to sound waves. At sound transparency, the overall thickness of the sound absorber—consisting of the absorption layer 6 and the insulation layer 4—therefore is composed of the thickness of these two layers 4 and 6. If the heavy layer 8 would not be perforated, the overall thickness of the sound absorber would be reduced to the thickness of the absorption layer 6. In addition to improving the sound damping, the heavy layer 8 that is transparent to sound in dependence on the frequency expands the absorption capacity of the insulation structure 2 according to the invention toward lower frequencies. In this context, it should be noted that the effective thickness of the insulation layer 4 referred to the overall thickness of the sound absorber is the thickness of the porous material situated therein.

According to FIG. 1, the insulation structure according to the invention can be arranged such that it lies on the stringers 12 that serve for the longitudinal reinforcement of the aircraft fuselage. The stringers 12 are arranged on the outer skin 14 of the aircraft, wherein the distance between the heavy layer 8 and the outer skin 14 and the mass of the heavy layer 8 are the decisive parameters for determining the double-wall frequency. The greater the distance between the heavy layer 8 and the outer skin 14, the lower the double-wall frequency.

Figure 2:
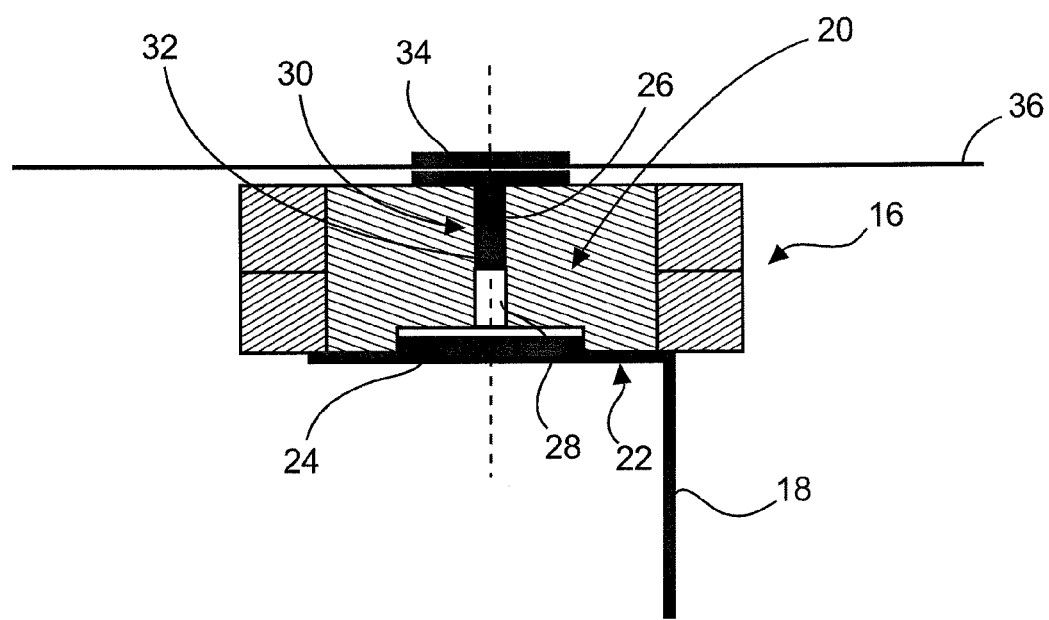
FIG. 2 shows a schematic representation of an insulation structure according to the invention with a mounting arrangement on a frame head.

According to FIG. 2, the insulation structure 16 according to the invention may also be positioned on a frame 18 by means of a mounting arrangement 20. In the example shown, the mounting arrangement 20 is bonded onto the head 22 of the frame 18 by means of an adhesive layer 24 such that no bores or the like are required for fixing the mounting arrangement 20 on the aircraft structure.

The mounting arrangement 20 preferably consists of two components, namely a first component 26 and a second component 28. The second component 28 is mounted on the head 22 of the frame 18 and the first component 26 is joined with the second component 28 during the installation of the insulation structure according to the invention. For this purpose, the insulation structure 16 according to the invention is designed for accommodating the first component 26 in such a way that the insulation structure 16 features, for example, suitable openings 30, into which oblong regions 32 of the first component 26 can be inserted.

In the illustration shown, the first component 26 features a widened receptacle 34 for the heavy layer 36 such that the distance between the heavy layer 36 and the aircraft skin 14 can be additionally increased. It would principally be sensible to mount the absorption layer that is not illustrated in FIG. 2, for example, on the interior lining elements on the fuselage side, i.e., above the heavy layer 36 in the plane of projection, where it can also act as secondary insulation for the cabin.

Figure 3:
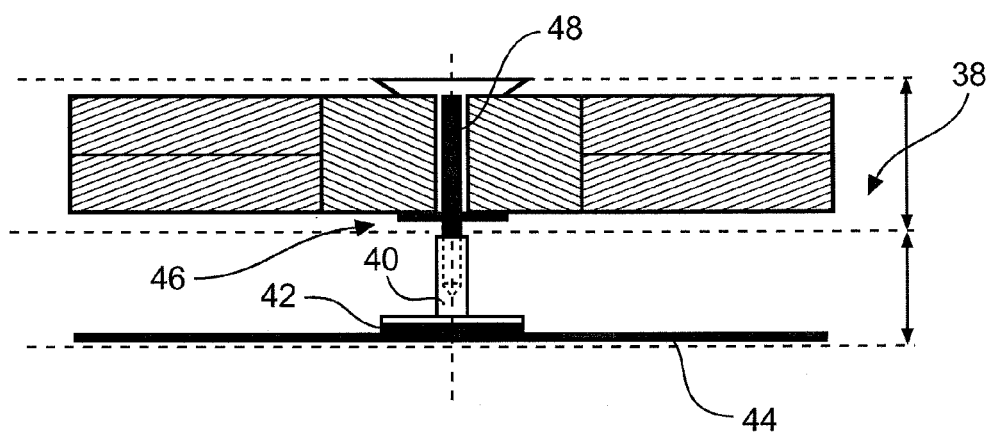
FIG. 3 shows another schematic representation of the insulation structure according to the invention with a mounting arrangement.

In case the aircraft to be equipped with the insulation structure according to the invention has a structure of fiber-reinforced plastic—for example CFRP—the mounting of the insulation structure 38 according to the invention can be realized as shown in FIG. 3. In this case, the second component 40 is directly bonded onto the fuselage skin 44 by means of an adhesive layer 42. Alternatively, the second component 40 of the mounting arrangement 46 may also be respectively laminated into the structure or into the fuselage skin 44. This could be realized by correspondingly integrating the second component 40 during the manufacture of the fuselage. Although the flexibility with respect to subsequent changes is lost in this case, a high degree of prefabrication and the most secure mounting possible of the second component 40 on the fuselage skin 44 can be realized. First components 48 of any above-described design are integrated into the insulation structure 30 according to the invention corresponding to the second components 46.

Figure 4A:
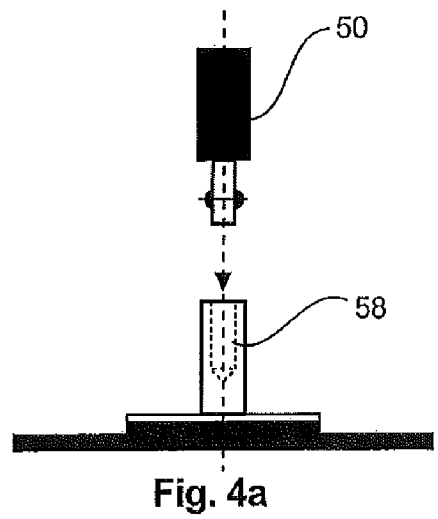
FIGS. 4a-4e show schematic representations of a second mounting component and four different first components of the mounting arrangement.
Figure 4B:
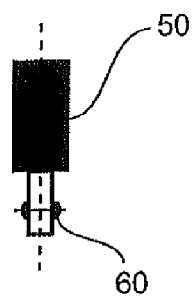
Figure 4C:
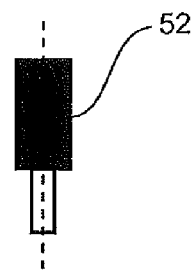
Figure 4D:
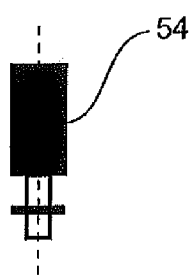
Figure 4E:
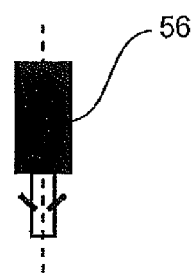

FIGS. 4a-4e show different embodiments of first components 50 to 56 that serve for being joined with second components 58 and fixed therein in the simplest fashion possible. For example, FIG. 4b shows a first component 50 with locking balls 60 that can engage into corresponding depressions in the second component 58. The other examples 52 to 56 shown comprise different clamping or locking connections.

Figure 5A:
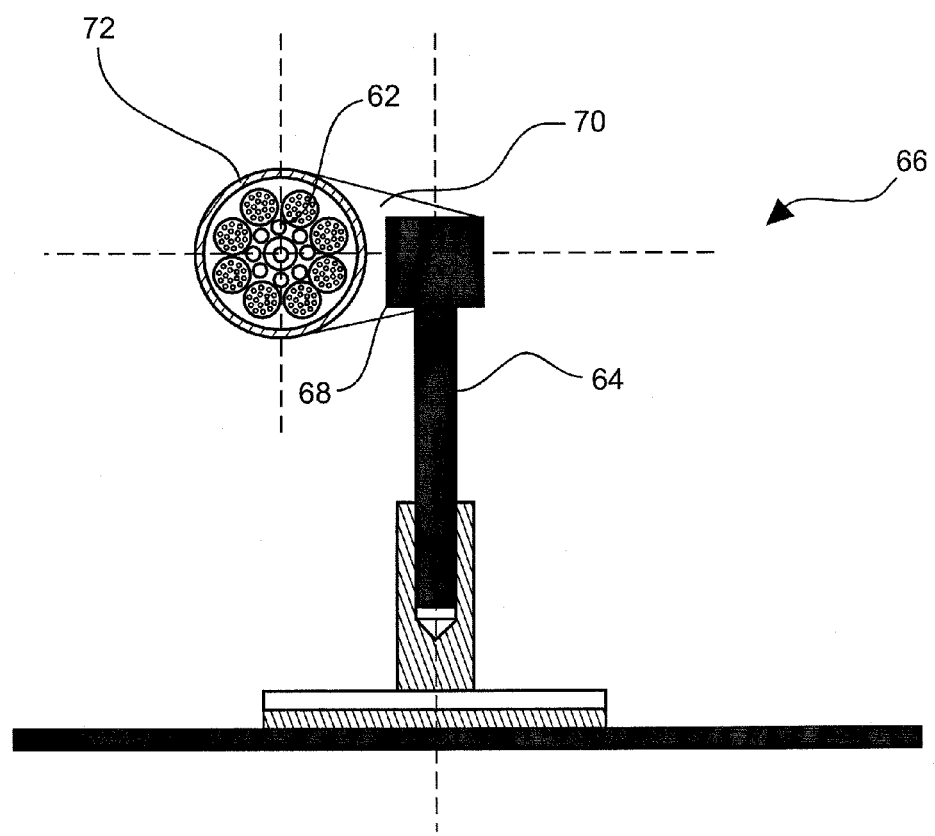
FIGS. 5a-5c show different components that are also arranged on the mounting arrangement.
Figure 5B:
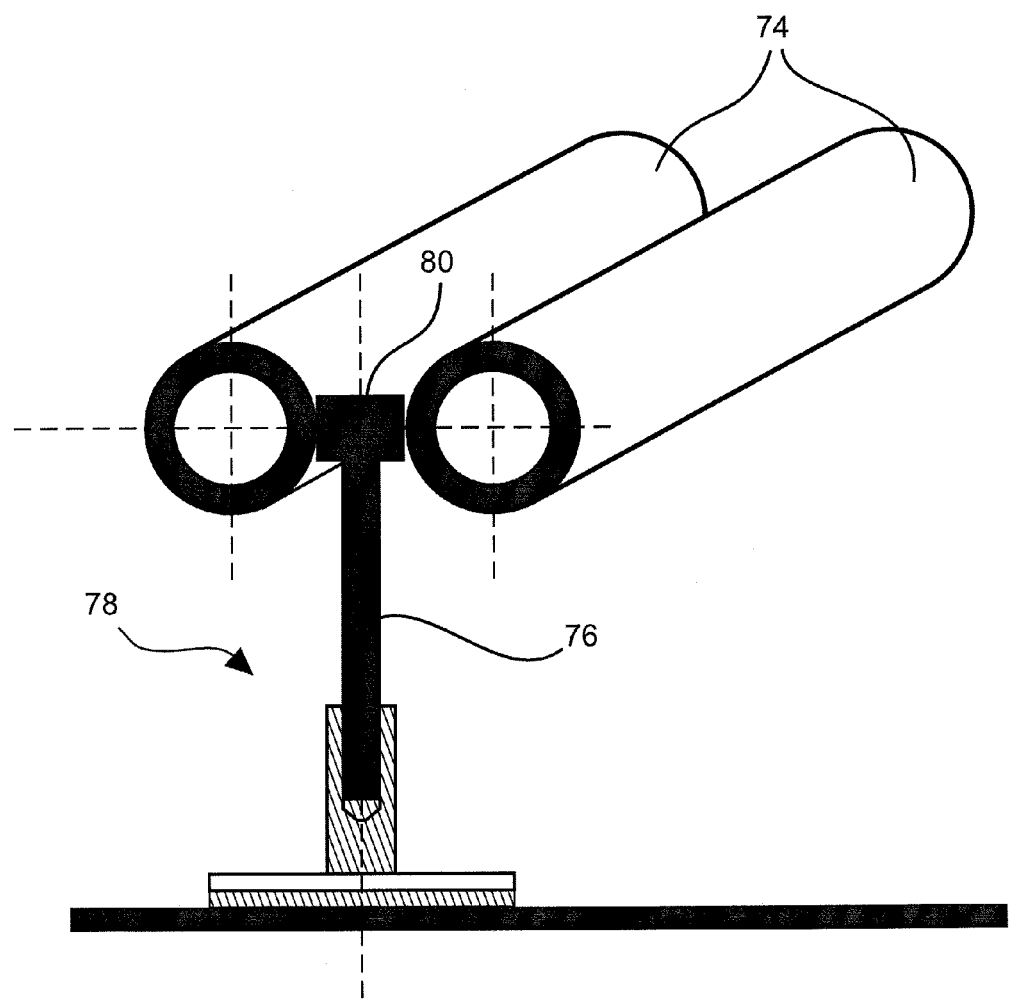
Figure 5C:
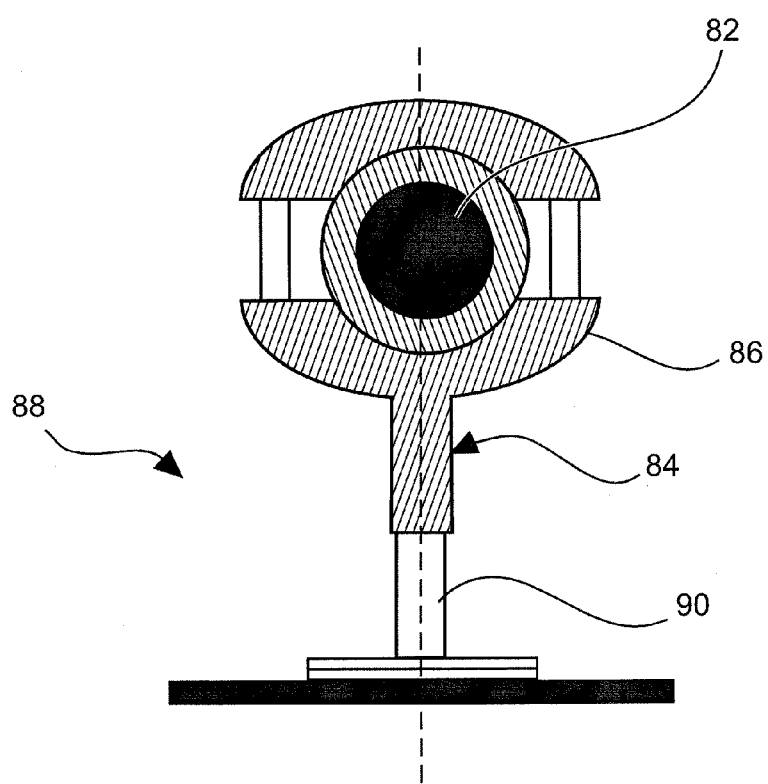

FIGS. 5a-5c show options for mounting other objects on the first components of the mounting arrangements. For example, FIG. 5a shows a wire harness 62 that is mounted on a first component 64 of a mounting arrangement 66. Consequently, a receptacle 68 is integrated into the first component, wherein this receptacle makes it possible to mount some sort of frame or bracket 70 that, in turn, holds a cable duct 72 or the like.

FIG. 5b shows a similar example for mounting oxygen lines 74, wherein the first component 76 of the mounting arrangement 78 is correspondingly designed for allowing a particularly secure mounting of oxygen lines 74 on a receptacle 80.

FIG. 5c ultimately shows that relatively thick fluid lines—such as, for example, an air duct 82 for the air-conditioning system—can also be mounted by means of a clamping device 26 arranged on the first component 84. The mounting arrangement 88 needs to be designed in accordance with this additional load to be supported such that there is no chance of the second component 90 breaking off, particularly a laminated second component 90.

Figure 6:
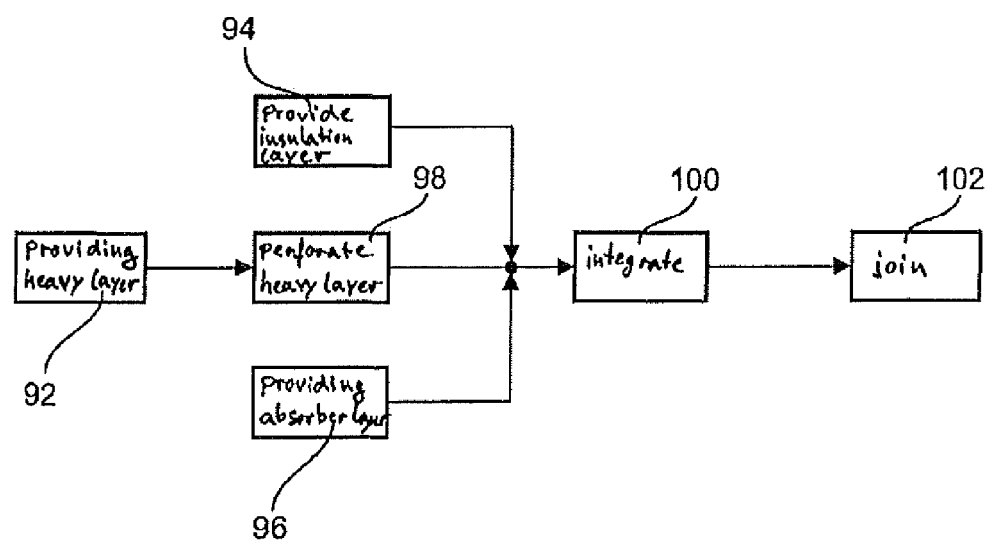
FIG. 6 shows an overview of the method according to the invention for manufacturing an insulation structure according to the invention.

FIG. 6 finally shows the method for manufacturing an inventive insulation structure according to the invention that begins with the steps providing (92) a heavy layer and providing (96) an absorber layer. Optionally, an insulation layer may also be provided (94). The heavy layer is perforated (98) subsequently, previously or simultaneously thereto, wherein the perforated area ratio of the perforation is realized in accordance with the essential features of the invention. Finally, one or more first components of the mounting arrangement are integrated (100) into at least one of the layers and subsequently joined with the correspondingly arranged second components (102).

As a supplement, it should be noted that "comprising" does not exclude other elements or steps, and that "an" or "a" does not exclude a plurality. It should furthermore be noted that features or steps that were described with reference to one of the above exemplary embodiments can also be used in combination with other features or steps of other above-described exemplary embodiments. Reference symbols in the claims should not be interpreted in a restrictive sense.

LIST OF REFERENCE SYMBOLS

2 Insulation structure
4 Insulation layer
6 Absorption layer
8 Heavy layer
10 Holes
12 Stringer
14 Skin
16 Insulation structure
18 Frame
20 Mounting arrangement
22 Frame head
24 Adhesive layer
26 First component of mounting arrangement
28 Second component of mounting arrangement
30 Opening
32 Oblong regions of first component
34 Receptacle for heavy layer
36 Heavy layer
38 Insulation structure
40 Second component
42 Adhesive layer
44 Fuselage skin
46 Mounting arrangement
48 First component of mounting arrangement
50 First component of mounting arrangement
512 First component of mounting arrangement
54 First component of mounting arrangement
56 First component of mounting arrangement
58 Second component of mounting arrangement
60 Locking Ball
62 Wire harness
64 First component of mounting arrangement
66 Mounting arrangement
68 Receptacle
70 Bracket
72 Cable duct
74 Oxygen lines
76 First component of mounting arrangement
78 Mounting arrangement
80 Receptacle
82 Air duct
84 First component of mounting arrangement
86 Clamping device
88 Mounting arrangement
90 Second component
92 Providing a heavy layer
94 Providing an insulation layer
96 Providing an absorption layer
98 Perforating the heavy layer
100 Integrating first components
102 Joining first components and second components

The invention claimed is:

1. An insulation structure for thermally and acoustically insulating an aircraft, the aircraft having a fuselage with an outer skin and an inner fuselage side, the insulation structure comprising:
the outer skin;
an insulation layer arranged at a distance from the outer skin, thereby defining an air volume therebetween;
at least one heavy layer arranged on the insulation layer on facing away from the outer skin; and
an absorption layer positioned on the heavy layer facing away from the outer skin;
wherein the heavy layer is perforated at least in certain areas defining a plurality of holes therein, and
wherein a ratio of the area of the plurality of holes provided in the perforated area to the entire area of the heavy layer is configured in such a way that the heavy layer is essentially transparent to sound for frequencies below a double-wall resonance frequency of the structure consisting of the outer skin, the insulation layer, the absorption layer, the heavy layer and the air volume between the outer skin and the insulation layer.

2. The insulation structure of claim 1, wherein the absorption layer comprises a porous material.

3. The insulation structure of claim 1, wherein the absorption layer has a density between 3.5 kg/m$^3$ and 25 kg/m$^3$.

4. The insulation structure of claim 1, wherein the absorption layer has a thickness between 5 mm and 55 mm.

5. The insulation structure of claim 1, wherein the heavy layer has a weight per unit area between 0.5 kg/m$^2$ and 4 kg/m$^2$.

6. The insulation structure of claim 1, wherein the insulation structure is configured for accommodating a first component of a mounting arrangement that corresponds to a second component of the mounting arrangement rigidly fixed on an aircraft structure in order to produce a connection.

7. The insulation structure of claim 6, wherein the second component of the mounting arrangement is arranged on an outer skin of the aircraft on an inner side of a fuselage.

8. The insulation structure of claim 6, wherein the second component of the mounting arrangement is arranged on or on top of a structural reinforcing component on an inner side of a fuselage.

9. The insulation structure of claim 6, wherein the second component of the mounting arrangement is rigidly bonded onto or laminated into the aircraft structure.

10. The insulation structure of claim 6, wherein the first component and the second component are configured for producing a positive or non-positive connection.

11. The insulation structure of claim 6, wherein the first component is configured for mounting objects, devices, or lines.

12. A method for manufacturing an insulation structure in an aircraft, the aircraft having a fuselage with an outer skin and an inner fuselage side, the insulation structure comprising the outer skin and at least one heavy layer, the method comprising:

- providing an insulation layer;
- providing an absorption layer;
- providing a heavy layer;
- perforating the heavy layer, thereby defining a plurality of holes therein,
- wherein a ratio of the area of the plurality of holes provided in the perforated area to the entire area of the heavy layer is configured in such a way that the heavy layer is essentially transparent to sound for frequencies below a double-wall resonance frequency of the structure consisting of the outer skin, the insulation layer, the absorption layer, the heavy layer and the air volume between the outer skin and the insulation layer;
- integrating at least one first component of a mounting arrangement into at least one of the absorption layer and the heavy layer,
- joining the at least one first component of the mounting arrangement with at least one second component of the mounting arrangement that are rigidly arranged on the insulation structure.

13. An aircraft comprising an insulation structure for thermally and acoustically insulating an aircraft, the aircraft having a fuselage with an outer skin and an inner fuselage side, the insulation structure comprising:

- the outer skin;
- an insulation layer arranged at a distance from the outer skin, thereby defining an air volume therebetween;
- at least one heavy layer arranged on the insulation layer on a surface facing away from the outer skin; and
- an absorption layer positioned on the heavy layer facing away from the outer skin;
- wherein the heavy layer is perforated at least in certain areas defining a plurality of holes therein, and
- wherein a ratio of the area of the plurality of holes provided in the perforated area to the entire area of the heavy layer is configured in such a way that the heavy layer is essentially transparent to sound for frequencies below a double-wall resonance frequency of the structure consisting of the outer skin, the insulation layer, the absorption layer, the heavy layer and the air volume between the outer skin and the insulation layer.

* * * * *